March 1, 1960 C. VAN DER LELY ET AL 2,926,476
METHOD OF RAKING A CROP
Filed May 28, 1956 2 Sheets-Sheet 1
FIG. 1
FIG. 2
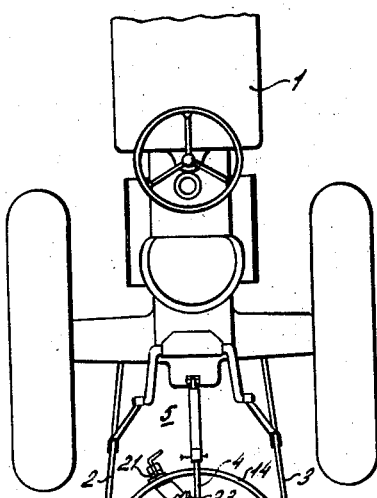
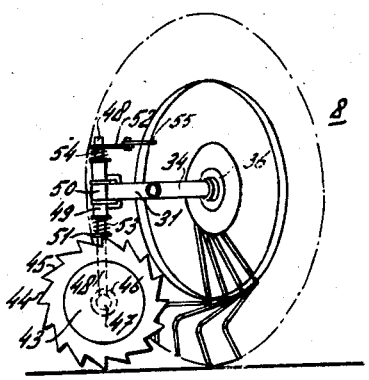
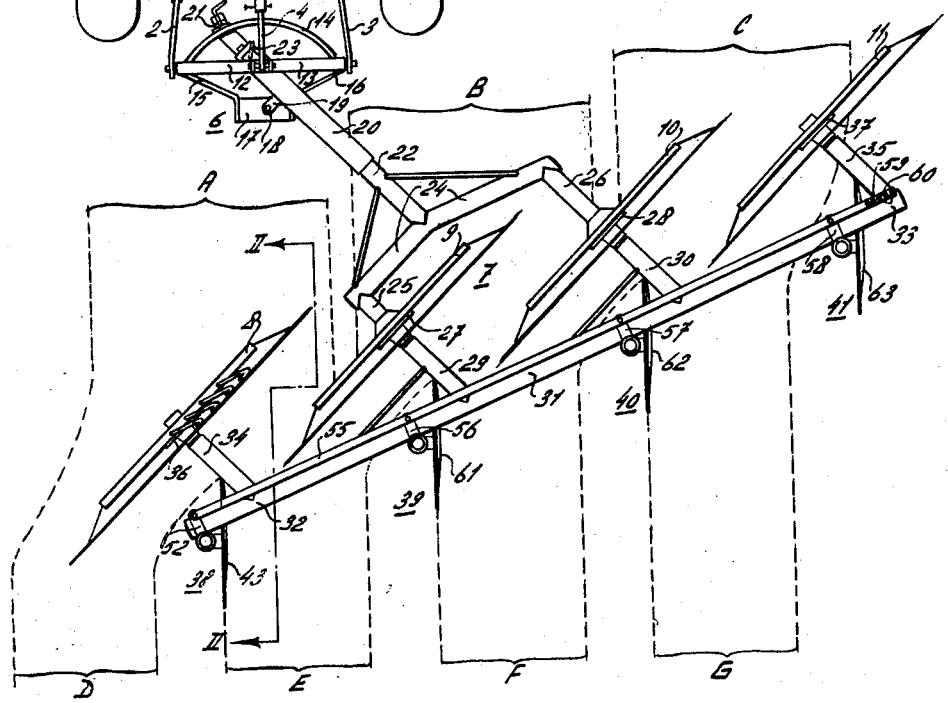

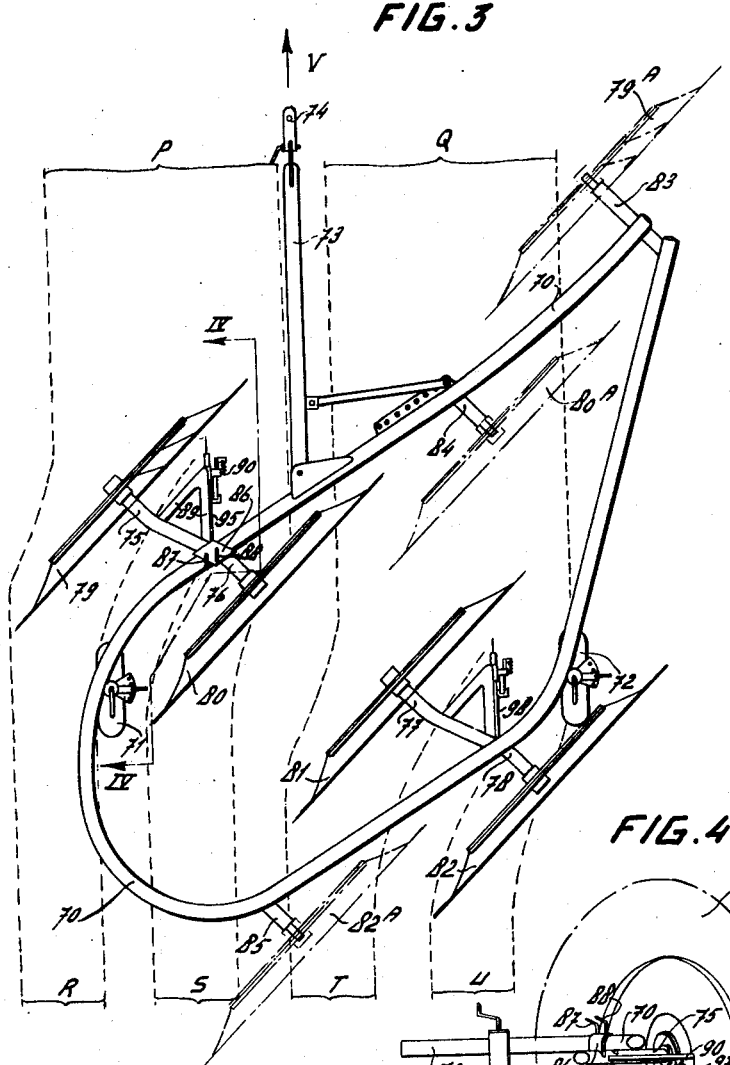

2,926,476
METHOD OF RAKING A CROP

Cornelis van der Lely and Ary van der Lely, Maasland, Netherlands, assignors to C. van der Lely N.V., Maasland, Netherlands, a Dutch limited liability company Application May 28, 1956, Serial No. 587,639
Claims priority, application Netherlands June 4, 1955
6 Claims. (Cl. 56—1)

This invention relates to methods for working crop lying in swaths on the ground by means of rake wheels simultaneously working at least two swaths.

The working, by means of rake wheels, of heavy crop lying in swaths is generally known and includes raking, swath turning and tedding. In raking, the material is piled up in very high swaths, so that this is an operation which in general cannot be performed until the crop has dried. The turning of swaths by means of rake wheels causes the swaths to be displaced for a small distance, the swath making a rolling movement with the undermost crop coming to the top. If there is no wind, the interior of the swath dries slowly, even after a further turning.

As a result of tedding the crop by means of rake wheels, as they are mown the crop piled up in swaths is displaced a very small distance. Only if the crop is very light is there a distinct separation of material worked by the separate wheels. With heavy crop the effect of the known manner of tedding, however, is considerably less favorable, for in this case the swath is laterally displaced a small distance more or less as a whole, no systematical turning being obtained. A repetition of the working will not result in an improvement, but only in that the material will come to lie in irregularly spread heaps.

It is an object of the invention to provide a method enabling a quick drying of the crop and also permitting further treatments which greatly aid the drying. According to the invention, the crop is arranged in the shape of separate swaths, the number of which is greater than the number of worked swaths. For instance, two swaths of heavy crop which come into existence during mowing can be formed into three, four, five or six separate swaths. Said small swaths dry easier than the original larger swaths and, because of their being completely separated, they can be turned as often as desired without the crop heaping up irregularly. The method according to the invention is preferably carried out in such a way that each swath lying on the land is seized directly by at least two rake wheels distributing the material of the original swath over at least two new swaths. According to the invention, the method can be performed very favorably in such a way that the material discharged between two rake wheels, which divide the material of the original swath into two different swaths, is prevented from being displaced too far by means of an auxiliary member. Thus, the swaths are completely separated.

Further features and details will be hereinafter more fully described with reference to the accompanying drawing in which two preferred embodiments of the method according to the invention are illustrated by way of example and in which:

Fig. 1 shows a plan elevation of a first device with which the method according to the invention can be carried out, Fig. 2 represents a vertical section through a part of said device according to the line II—II in Fig. 1, Fig. 3 is a plan elevation of a second device with which the method according to the invention can be carried out, Fig. 4 shows a vertical section through a part of said device according to the line IV—IV in Fig. 3.

In Fig. 1, the tractor of a device for carrying out the method according to the invention is indicated by 1. The tractor 1 is provided at its rear with three arms 2, 3 and 4 constituting together a three-point-lifting device 5. The lifting device 5 carries a fastening device 6 for the implement 7 comprising four rake wheels 8, 9, 10 and 11. The fastening device 6 is composed of two bars 12 and 13 rigidly connected to the ends of a quarter circular bow 14 as well as to two strips 15 and 16 rigidly connected to a plate 17. The plate 17 carries a pin 18 about which is hingeable an arm 19 carrying a substantially horizontal tube 20. The fore-part of said tube carries a locking device 21 which slides along the bow 14 when the tube 20 turns about the pin 18. The device 21 can be locked at a number of places on the bow 14.

An axle 22 is rotatably, but not slidably supported in the tube 20. By means of a locking pin 23, the axle 22 can be locked in the tube 20 in the position shown in Fig. 1, but there is however so much play that the axle 22 can turn almost 10° to both sides. The axle 22 carries a bar 24 to which are connected two axles 25 and 26 which are parallel to the axle 22. The hubs 27 and 28 of the rake wheels 9 and 10 are freely rotatable on the axles 25 and 26. The prolongations 29 and 30 of the axles 25 and 26 extend through the hubs 27 and 28 and carry together a tube 31 to which are attached at 32 and 33 two axles 34 and 35 which are parallel to the axle 22. The hubs 36 and 37 of the rake wheels 8 and 11 are mounted on said axles 34 and 35 so as to be freely rotatable. The hubs 36, 27, 28, 37 are substantially in alignment.

Further, the tube 31 carries four stopping devices 38, 39, 40 and 41 for the crop, all having the same construction. This construction and the fastening to the tube 31 is more fully explained for the stopping member 38 by means of Fig. 2. The most important member of the device 38 is the separating or dividing wheel 43 provided with circumferential tines 44 and 45. The tines form with the disc of the wheel 43 a single piece of metal and the bases of the tines broaden in the tangential direction of the wheel disc, whereas they taper toward the outside. The plate of the wheel 43 comprises a flat edge, but the central part is somewhat convex for increasing rigidity. In its central part, the disc 43 is provided with a hub 46 which is freely rotatable about a horizontal axle 47. The axle 47 forms the lower end of a vertical axle 48 which is supported rotatably in a bushing 49. The bushing 49 is attached to the tube 31 at 50. A ring 51 below the bushing 49 and an arm 52 above said bushing are immovably attached to the axle 48, whereas a spring 53 is mounted between the ring 51 and the bushing 49 and a spring 54 between the bushing 49 and the arm 52. The free end of the arm 52 is hingedly connected to a strip 55 extending over the entire length of the tube 31, said strip 55 being connected at the same time to arms 56, 57 and 58 of the devices 39, 40 and 41, each of which corresponds to the arm 52 of the device 38. The fore-part of the strip 55 is provided with some holes 59 and 60. By means of any given hole, the strip 55 can be mounted on a vertical pin, which is not shown, and which is rigidly attached to the tube 31. Owing to this, the arms 52, 56, 57 and 58 are kept in parallel positions, due to which the separating wheels 43, 61, 62, 63 of the stopping members 38, 39, 40 and 41 are kept in parallel positions as well. In the case shown in Fig. 1, the separating wheels are arranged in such a way that each of the planes of said wheels comprises a line situated in the direction of travel of the tractor 1. In order to be able to maintain said position when the tube 20 is turned about the pin 18 and is locked in another position, the position of the wheels 43, 61, 62 and 63 is adjustable with regard to the tube 31 as described.

In the case shown in Fig. 1, the working of the device described is as follows. The device works three swaths A, B and C and leaves their material in four smaller swaths D, E, F and G on the land. If the separating wheels 43, 61, 62 and 63 should be lacking, the material would not be divided into four separate swaths, but would be left as a single mass which would become very irregular during further treatment by the same device. By the presence of the separating wheels, however, a splitting up into four separate swaths D, E, F and G results which during further treatment with the same device are displaced and turned, but which maintain their general shape.

With regard, for example, to the swath C, the material of said swath is seized by both rake wheels 10 and 11. Due to the coherence of the material lying on the ground, some of the material dropped behind the rake wheels 10 and 11 is pulled along by the material lying in front of said rake wheels, so that the material would be displaced more or less as a body to the left. However, the separating wheel 62 pushes a part of the material moving between the wheels 10 and 11 against the ground and prevents it from moving further to the left. In effect, the material is divided. The shape of the tines (see elements 44 and 45 in Fig. 2) is such that the material being pushed against the ground will not be caught in the wheel. The rake wheel 10 takes a part of the material of the swath C and a part of the material of the swath B and forms the new swath F which is separated by the working of the separating wheel 62 from the swath formed by rake wheel 11. The swath F is separated from the swath E by means of the working of the separating wheel 61, and so on.

It is important that the separating wheels be situated in the immediate vicinity of the ground, because otherwise no effective working could be obtained. Preferably, the springs 53 and 54 are provided in such a way that the separating wheel 43 during normal operation is pushed against the ground and that the wheel can adapt itself to the irregularities of the ground while continuing to be pushed against the ground. For that purpose, the axle 48 can slide in the bushing 49. Further, it is important that each separating wheel be rather small compared with the rake wheel located in front of it, because the point where the separating wheel pushes the crop against the ground would otherwise be a rather great distance behind the running wheel in question. This would be open to objection for a good working. Further, it is advantageous that the wheel plane of a separating wheel be closed, because of the fact that crop collects easily in openings in the wheel plane.

Tines 44 and 45 on the separating wheels increase the holding ability of the wheels due to the crops being pressed together between the tines.

The rolling movement of a separating wheel is very advantageous, because undesirable sliding of the material is avoided by said rolling movement.

When the device 7 is raised sufficiently high from the ground by means of the lifting device 5 of the tractor 1 and the pin 23 is removed temporarily, the axle 22 can be turned through an angle of 180° in the tube 20, owing to which the rake wheels 8, 9, 10 and 11 will occupy a position which makes the device suitable for being used as a rake. By this turning, the devices 38, 39, 40 and 41 which are superfluous for the raking action are put out of operation automatically.

In Figs. 3 and 4, a device is shown with which two swaths lying on the land, e.g. in the shape in which they are left on the land by a mowing machine, can be divided into four swaths. Said device comprises a loop-shaped frame 70 which is supported by running wheels 71 and 72 and provided with a draw arm 73, the forepart 74 of which is connected to a tractor at a suitable height, after which the device can be moved over the land in the direction of the arrow V. The frame 70 further carries four parallel axles 75, 76, 77 and 78 on which four rake wheels 79, 80, 81 and 82 are mounted so as to be freely rotatable. If desired, the rake wheels 79, 80 and 82 can be removed from the axles 75, 76 and 78 and, for transmitting the device into a side-delivery rake, they can be mounted in the positions 79A, 80A and 82A on other axles 83, 84 and 85 fixed for that purpose to the frame 70.

The axles 75 and 76 are fixed to the frame 70 by means of a bushing 86 which is slidable about the frame tube and which bushing 86 can be locked immovably to the frame 70 by means of locking pins 87 and 88 in various positions, the axles 75 and 76, however, always remaining parallel to the axles 77 and 78. The axle 75 carries a bow 89 on which are mounted two horizontal pins 90 and 91 (see also Fig. 4). An angle lever having legs 92 and 92A is applied rotatably about the pin 91, the longer leg 92 carrying a horizontal axle 93 for a wheel 95 provided with tines 94 and the shorter leg 92A carrying a pin 96. Between the pins 90 and 96 is stretched a draw spring 97 which tends to move the pin 96 upwards and the wheel 95 viewed in Fig. 4 to the right, said wheel thus being pushed against the ground. When, on the other hand, the wheel 95 is manually put in the position 95A, the spring 97 tends to keep the wheel out of contact with the ground. In the same way as the wheel 95 is attached to the axle 75, a wheel 98 (see Fig. 3) is attached to the axle 77. When the axles 75 and 76 are slid over the frame tube 70, the wheel 95 maintains the same positions with regard to the rake wheels 79 and 80.

The working of the device described is as follows. The device travels forward behind a tractor over the land in such a way that the rake wheels 79 and 80 work a swath P and the rake wheels 81 and 82 a swath Q. Each of the swaths P and Q is divided in two by the wheels 95 and 98 in cooperation with the rake wheels 79 and 81; that is, the rake wheel 79 forms a swath R and the rake wheel 80 a swath S from the material of the swath P. The swaths T and V come into existence from the swath Q in the same way.

What we claim is:

1. A method of improving the discharges of adjacent raking wheels comprising dividing one of the discharges into separate parts and combining one of the parts with the other of the discharges.

2. A method of tedding adjacent swaths comprising dividing each of the swaths into separate sections and combining the closest sections of the different swaths.

3. A method of tedding a plurality of parallel swaths comprising dividing each swath into two sections and combining adjacent sections from different swaths.

4. A method of improving the deliveries of a unit having adjacent raking wheels wherein the raking wheels have normal deliveries along their frontmost sides which, due to the alignment of the wheels, may travel along the rear of the next adjacent raking wheel, comprising dividing one of the normal deliveries and combining a divided part of said one delivery with at least a part of another delivery.

5. A method of processing adjacent swaths of crop comprising forming an additional swath by combining the adjacent sides of the swaths.

6. A method of processing a swath of crop comprising laterally displacing the swath and impeding the movement of a part of the laterally displaced swath.

References Cited in the file of this patent

UNITED STATES PATENTS

| | | |
|---|---|---|
| 1,512,750 | Eberle | Oct. 21, 1924 |
| 2,602,280 | Crowe et al. | July 8, 1952 |
| 2,625,000 | Benlow | Jan. 13, 1953 |
| 2,635,411 | Hicks | Apr. 21, 1953 |
| 2,683,345 | Meyer | July 13, 1954 |